Figure 2:
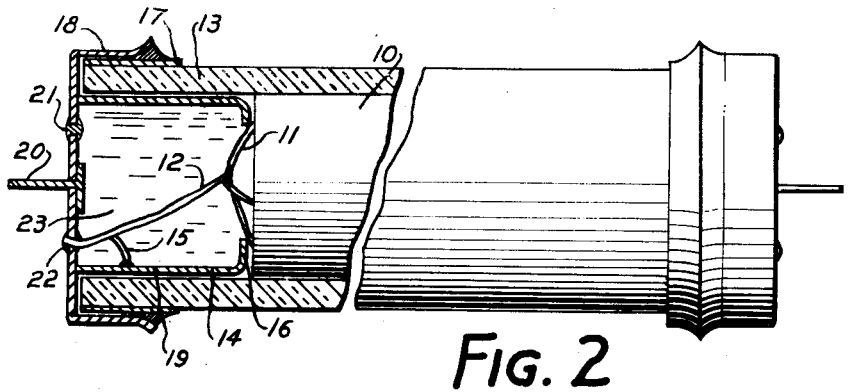

June 5, 1951  E. C. DOUGHTY, JR  2,555,326
HIGH-VOLTAGE CONDENSER
Filed June 17, 1946

EDWARD CROSBY DOUGHTY, JR.
INVENTOR

BY Arthur F. Connolly
ATTORNEY

Patented June 5, 1951

2,555,326

UNITED STATES PATENT OFFICE 2,555,326

HIGH-VOLTAGE CONDENSER

Edward Crosby Doughty, Jr., Williamstown, Mass., assignor to Sprague Electric Company, North Adams, Mass., a corporation of Massachusetts Application June 17, 1946, Serial No. 677,210

4 Claims. (Cl. 175—41)

This invention relates to improved high voltage condensers and more specifically refers to electrical condensers encased in glass tubes with metal end closures, generally known as ferrule type condensers.

In recent years the demand for high voltage condensers of heretofore unattainable reliability has resulted in the development of durable, hermetically sealed glass tube condensers, as well as resistors, R. F. chokes, rectifiers and numerous other electrical elements. While it has been possible to design units which would meet the requirements for hermetic sealing of condensers, resistors, etc., it has, in many cases, been found that a high voltage alternating current will lead ultimately to either partial or complete failure of the unit, due to corona resulting in carbonization and similar breakdown of the unit.

It has been difficult to identify the source of this corona and so far as is known, no dependable corona shield for the interior of devices of this type has been developed.

It is an object of this invention to overcome the foregoing and related disadvantage. A further object is to produce an improved, yet inexpensive, corona shield element. A still further object is to produce an improved high voltage condenser employing a novel field distributing device. A still further object is to produce an improved glass tube type high voltage condenser for alternating current operation. Additional objects will become apparent from the following description and claims.

These objects are obtained in accordance with the present invention which concerns an electric field distributing device comprising a cylindrical conductor of dimensions such as to fit within the insulating casing of the condenser section and positioned between said section and its metal end closures. The invention is more specifically concerned with a corona shield, for an electrical condenser encased in a glass tube with metal end caps, comprising a cylindrical metal element of a diameter slightly less than the inner diameter of the glass tube disposed between the end of the condenser section and the metal cap and electrically connected thereto. In a more restricted sense the invention is concerned with a corona shield, for an electrical condenser encased in a cylindrical glass tube with metal ferrule end closures, comprising a cylindrical metal element fitting within said glass tube with an inner lip at one extremity, said shield disposed between the condenser section and the metal ferrule, said lip contacting said condenser section and the other extremity of said shield physically and electrically contacting said ferrule. In a still more restricted sense the invention is concerned with an electrical condenser comprising a convolutely wound condenser section encased in a glass tube with ferrule type metal end closures hermetically sealed to said tube, said condenser being spacedly separated from said end closures by means of cylindrical metal tubes of length substantially greater than said end closures, each of said tubes being electrically connected to the respective end closure. In one of its preferred embodiments, the invention is concerned with a high voltage electrical condenser comprising a convolutely wound condenser section encased in a tempered glass tube with ferrule type metal end closures hermetically sealed to said tube, said condenser section being spacedly separated from said end closures by means of electrical field distributing shields, each consisting of a cylindrical metal tube of diameter slightly less than the inner diameter of said glass tube and axial length about twice the axial length of said end closures, said shields being electrically connected to their respective end closure.

Figure 1:
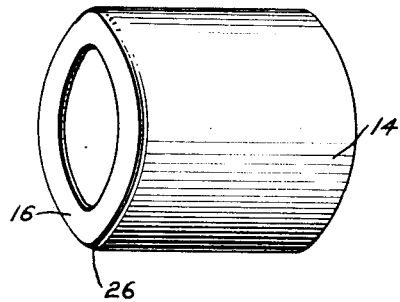

The invention will be more readily understood by reference to the accompanying drawing in which Figure 1 shows a diagrammatic view of the corona shield and Figure 2 shows a partial cross section of a high voltage ferrule type condenser employing said shield.

Referring more specifically to Figure 1, the corona shield comprises a cylindrical electrical conducting metal tube 14 which is preferably provided with an inner lip 16 disposed at one end of the tube. The inner lip, the plane of which is approximately vertical to the axis of the tube 14, is joined to the tube by means of a curved junction 26. This curved position is preferable, since it presents no sharp edges at the points of high electrical field strength.

Referring to Figure 2, a convolutely wound condenser section 10, with terminal tabs 11 extending from one axial extremity, is disposed within an insulating casing 13. The condenser section 10 is preferably one of the well known high voltage types and is preferably wound with the staggered, floating electrode structure disclosed in co-pending application, S. N. 559,388, filed on October 19, 1944, now abandoned, by Preston Robinson et al. Insulating casing 13 is preferably of a non-porous, substantially rigid tube of tempered glass or special refractory material.

Ferrule type metal end closure 18 is hermetically soldered and sealed by means of solder 19 to the metallized band 17 which is integrally bonded to the casing 13. Separating condenser section 10 from metal end closure 18 is shield 14, with the inner lip 16 contacting tabs 11 and/or section 10. Terminal wire 12 is soldered or riveted to tabs 11 and connection 15, which in turn is connected to shield 14. The other extremity of wire 12 is connected to end closure 18 by means of solder 22. Closure 18 is also provided with a mounting stud 20 which is bonded or otherwise affixed thereto. Following assembly of the condenser in its case and the hermetic soldering of closure 18 to metallized band 17 the unit may be impregnated with a dielectric oil 23 through a fill hole 21, which is soldered shut to effect a permanent hermetic sealing of the assembly with its dielectric oil impregnant.

I have found that the use of shield 14 electrically connected to end closure 18 and terminal tabs 11 eliminates corona effects within the casing 13. These effects may be caused by uneven electrical field disposition between portions of condenser section 10 (those portions of opposite polarity) and metallized band 17. It is known that sharp corners and edges will result in concentrated electrical fields, but it is virtually impossible to eliminate sharp edges, burrs, etc., from metallized bands, end closure lips and in some cases, mounting members. By means of the corona shield of this invention, I have found that such imperfections do not adversely affect the operation of the condenser unit and assembly.

To obtain optimum disposition of stray electric fields, I preferably design shield 14 so that its axial length is substantially greater and advisably at least twice as long as the axial length of metallized band 17, or the axial length of metal closure 18.

It is obvious that the advantages gained by use of my novel device are not limited to tubular type condensers. The shields, in some cases slightly modified, may be used for glass tube-encased high voltage resistors, inductors, fuses, transformers, rectifiers and the like. My corona shield raises the voltage required to produce breakdown and arcing and also provides an inexpensive spacing means.

As many apparently widely different embodiments of this invention may be made without departing from the spirit and scope hereof, it is to be understood that the invention is not limited to the specific embodiments hereof, except as defined in the appended claims.

What I claim is:

1. An electrical condenser comprising a convolutely wound condenser section having a terminal at each end, said section being immersed in a dielectric liquid encased in a cylindrical glass tube with ferrule type metal end closures hermetically sealed to said tube and connected to the respective terminals, said condenser section being spaced from the respective end closures by means of a pair of cylindrical metal tubes each fitting closely against the inner surface of the glass tube, having a length substantially greater than, and electrically connected to its adjacent end closure, and having an inwardly turned periphery at the end facing the condenser section.

2. A high voltage electrical condenser comprising a convolutely wound condenser section having a terminal at each end, said section being immersed in a dielectric liquid encased in a tempered cylindrical glass tube with ferrule type metal end closures hermetically sealed to said tube and connected to the respective terminals, said condenser section being spaced from said end closures by means of a pair of shields, each shield consisting of a cylindrical metal tube having a diameter slightly less than the inner diameter of said glass tube, an axial length about twice that of said end closures, and an internally-directed peripheral flange at the end adjacent said condenser section, said shields being electrically connected to their respective adjacent end closures.

3. An electrical condenser comprising a dielectric tubular casing covered at its ends by electrically conductive caps, a rolled capacitance unit extending generally coaxially along a portion of the interior of said casing spaced from said caps, and having connection terminals connected to the respective caps, a liquid dielectric impregnated in the unit and contained in the freeboard spacing between the capacitance unit and said caps, and a pair of tubular corona-reducing electrically-conductive spacer shields each immersed in the dielectric liquid between the unit and the respective caps, each shield having an inwardly turned periphery at the end facing the unit, said shields closely fitting within and extending longitudinally of said casing substantially beyond the caps; and separate electrical connections between the individual shields and their respective adjacent caps.

4. The combination as defined by claim 3 in which the rolled capacitance unit is a high voltage convolutely wound set of insulated electrodes including a floating electrode.

EDWARD CROSBY DOUGHTY, Jr.

REFERENCES CITED

The following references are of record in the file of this patent:

UNITED STATES PATENTS

| Number | Name | Date |
| --- | --- | --- |
| 2,047,273 | Kopinski | July 14, 1936 |
| 2,135,085 | Ludwig | Nov. 1, 1938 |
| 2,454,049 | Floyd | Nov. 16, 1948 |